(No Model.)

H. P. BALL.
INSULATING TURNBUCKLE.

No. 518,213. Patented Apr. 17, 1894.

WITNESSES.
A. F. Macdonald.
J. J. Johnston

INVENTOR.
Henry P. Ball, by
Bentley and Blodgett,
Att'ys

UNITED STATES PATENT OFFICE.

HENRY PRICE BALL, OF SCHENECTADY, NEW YORK, ASSIGNOR TO THE GENERAL ELECTRIC COMPANY, OF BOSTON, MASSACHUSETTS.

INSULATING-TURNBUCKLE.

SPECIFICATION forming part of Letters Patent No. 518,213, dated April 17, 1894.

Application filed December 22, 1893. Serial No. 494,436. (No model.)

*To all whom it may concern:*

Be it known that I, HENRY PRICE BALL, a citizen of the United States, and a resident of Schenectady, county of Schenectady, and State of New York, have invented certain new and useful Improvements in Insulating-Turnbuckles, of which the following is a specification.

My invention relates to the parts used in the overhead construction of electric railway lines, and particularly to the devices used to strain the guy-wires or section lines of an overhead conductor, commonly called "turnbuckles," which are generally arranged with their parts insulated from one another so as to separate the sections referred to; and it has for its object to provide a simple, cheap and very strong construction of such a turnbuckle.

The accompanying drawings illustrate an embodiment of my invention, in which—

Figure 1:
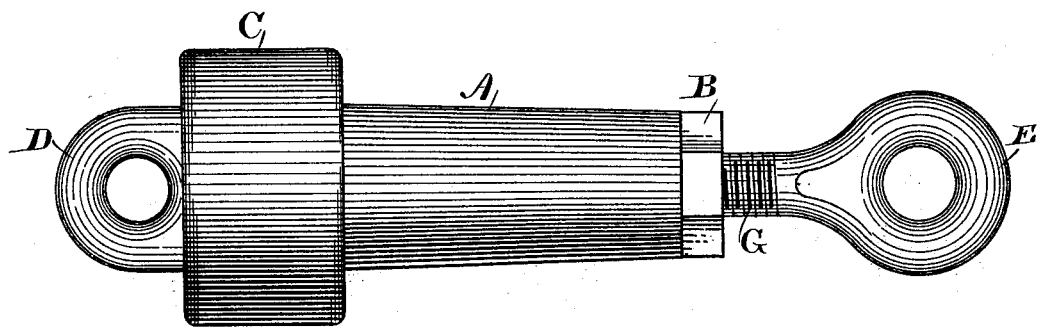
Figure 2:
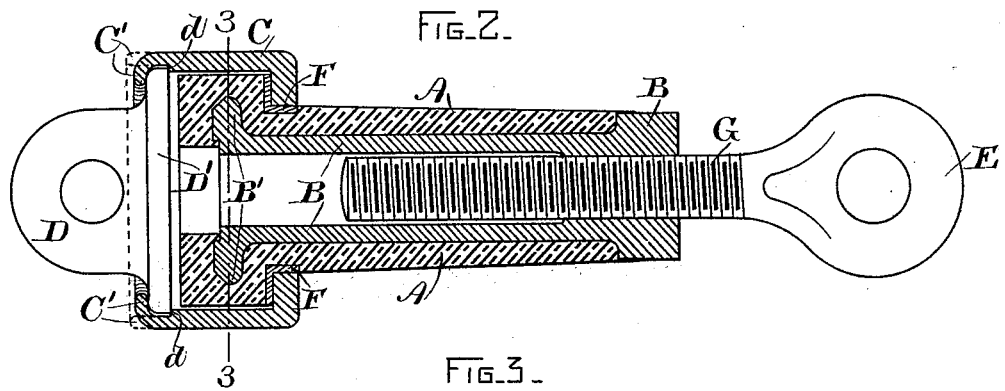
Figure 3:
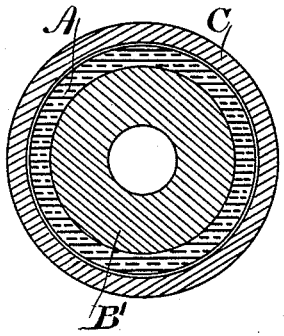

Figure 1 is an elevation, Fig. 2 a vertical section, and Fig. 3 a cross section upon the line 3—3 in Fig. 2, of my improved turnbuckle.

A is the insulating material, which is compressed into position, and made practically integral with the central shank or sleeve B. This shank B is provided at one end with a hexagon nut cast integrally with it. In this part of the shank and in its central axis is tapped a screw thread in which the eye-bolt E, provided with a corresponding thread G may turn; the lower part of the shank being reamed out somewhat larger than the diameter of the eye-bolt. At the lower part of the shank a flange B', shown in Figs. 2 and 3, is provided, and this flange is wider than the opening in the cup hereinafter referred to. The cup C is best seen in Fig. 2; the opening in its bottom is, as just referred to, large enough to admit the central shank after the insulation is compressed upon it, but the flange B' prevents the shank being drawn through the opening. At the opposite side of the cup a shoulder $d$ is formed, against which the eye-plate D', having the eye D, abuts. The extreme edge C' of the cup is turned over by a suitable tool so as to hold the eye-plate D' securely but loosely in position.

As shown in Fig. 2, a considerable body of insulating material is compressed into position around the flange B', and as one section of line would be secured to the eye D and the other to the eye-bolt E, the thickness of insulation will be found sufficient to thoroughly insulate the parts of the turnbuckle. As the cup C must be free to turn upon the shank B, and as it would wear through the insulation if frequently turned, a small brass washer F is provided, which is set into the insulation flush with its surface, and provides a bearing for the cup.

I have found the device just described efficient and reliable, and have also found that it may be easily and cheaply manufactured.

What I claim as new, and desire to secure by Letters Patent of the United States, is—

1. As a new article of manufacture, an insulating turn-buckle having a central shank, a cup adapted to rotate about such shank, insulating material interposed between the cup and shank, an eye-bolt threaded into the shank and an eye-plate secured to the cup.

2. As a new article of manufacture, an insulating turn-buckle having the following parts; a central insulated shank, an eye-bolt threaded therein, a cup rotatable about the shank, an eye-plate secured to the cup and a washer between the cup and the shank but insulated from the shank.

3. As a new article of manufacture, an insulating turn-buckle comprising an eye-bolt having a screw thread and adapted to engage the shank, a cup rotatable about the shank and an eye-plate attached to the cup by having a lip of the cup turned over to engage the plate, substantially as described.

4. As a new article of manufacture, an insulating turn-buckle comprising the following parts; a central shank having a flange as B', a cup having a hole in its bottom smaller than the flange but larger than the shank, insulating material between the cup and shank, a washer adapted to take the wear between the cup and shank, an eye-bolt having a screw thread engaging with one end of the shank and an eye-plate secured to the cup by having the edge of the cup turned over upon it.

In witness whereof I have hereunto set my hand this 15th day of December, 1893.

HENRY PRICE BALL.

Witnesses.
C. E. CARPENTER,
W. H. MOTT.